United States Patent
Prevost et al.

(10) Patent No.: US 10,923,928 B2
(45) Date of Patent: Feb. 16, 2021

(54) USB INTERFACE FOR RECHARGING AN ELECTRONIC DEVICE, INTENDED TO EQUIP A TRANSPORT VEHICLE

(71) Applicant: Alstom Transport Technologies, Saint-Ouen (FR)

(72) Inventors: Thomas Prevost, Yves (FR); Sébastien Taillandier, Angoulins (FR)

(73) Assignee: Alstom Transport Technologies, Saint-Ouen (FR)

( * ) Notice: Subject to any disclaimer, the term of this patent is extended or adjusted under 35 U.S.C. 154(b) by 221 days.

(21) Appl. No.: 15/587,753

(22) Filed: May 5, 2017

(65) Prior Publication Data

US 2017/0331307 A1 Nov. 16, 2017

(30) Foreign Application Priority Data

May 12, 2016 (FR) ...................................... 1654256

(51) Int. Cl.
*H02J 7/00* (2006.01)
*B60N 3/02* (2006.01)
*H01R 13/514* (2006.01)
*H01R 13/502* (2006.01)

(52) U.S. Cl.
CPC .............. *H02J 7/0045* (2013.01); *B60N 3/02* (2013.01); *H01R 13/502* (2013.01); *H01R 13/514* (2013.01); *H02J 7/0027* (2013.01); *H02J 7/0042* (2013.01); *H02J 7/00* (2013.01)

(58) Field of Classification Search
CPC ............. H02J 2007/0062; H02J 7/0042; H02J 7/0045; H02J 7/0047; B60N 3/02; H01R 25/003; H01R 25/006; H01R 27/00; H01R 27/02; H01R 13/502; H01R 13/514;
(Continued)

(56) References Cited

U.S. PATENT DOCUMENTS 6,086,397 A * 7/2000 Chapman ............. H01R 25/003
439/214
6,666,712 B1 * 12/2003 Kramer ................... G06F 1/266
439/501

(Continued)

FOREIGN PATENT DOCUMENTS

CN 202481000 U 10/2012
CN 203005168 U 6/2013
(Continued)

OTHER PUBLICATIONS

Vitezslav Bures (Bur), 2014, "VIDEO: end of the exhausted mobilům. Ropid tested up to USB Chargers", http://praha.idnes.cz/primestky-autobus-je-vybaven-usb-nabijeckou-f3c-/praha-zpravy.aspx?c=A140819123517_praha-zpravy_bur, retrieved Jan. 20, 2017.
(Continued)

*Primary Examiner* — Oscar C Jimenez
(74) *Attorney, Agent, or Firm* — Troutman Pepper Hamilton Sanders LLP

(57) ABSTRACT

The USB interface comprises an electronic member comprising at least one USB jack, and connector elements able to connect each USB jack to cabling, and a support case, configured to be fastened on the handrail of the urban public transport vehicle, and including a housing for the electronic member.

10 Claims, 1 Drawing Sheet

(58) Field of Classification Search
CPC .... H01R 13/516; H01R 13/74; H01R 13/741; H01R 13/743
See application file for complete search history.

(56) References Cited

U.S. PATENT DOCUMENTS

| | | | | |
|---|---|---|---|---|
| 6,782,617 | B2* | 8/2004 | Pulizzi | H01R 13/743 |
| | | | | 29/825 |
| 6,830,477 | B2* | 12/2004 | Vander Vorste | H01R 13/743 |
| | | | | 439/214 |
| 7,756,268 | B2* | 7/2010 | Hazani | H01R 13/719 |
| | | | | 379/413.02 |
| 8,444,432 | B2 | 5/2013 | Byrne et al. | |
| 9,312,673 | B2* | 4/2016 | Byrne | H02G 3/185 |
| 10,116,102 | B2* | 10/2018 | Randall | H02J 7/0045 |
| 2012/0184132 | A1* | 7/2012 | Katou | H01R 13/64 |
| | | | | 439/535 |
| 2015/0333461 | A1 | 11/2015 | Byrne et al. | |
| 2015/0340826 | A1* | 11/2015 | Chien | H01R 13/7175 |
| | | | | 439/490 |

FOREIGN PATENT DOCUMENTS

| | | |
|---|---|---|
| CN | 204068390 U | 12/2014 |
| CN | 204179712 U | 2/2015 |

OTHER PUBLICATIONS

French Search Report dated Jan. 20, 2017, issued in corresponding French Application No. 1654256.

* cited by examiner

USB INTERFACE FOR RECHARGING AN ELECTRONIC DEVICE, INTENDED TO EQUIP A TRANSPORT VEHICLE

CROSS-REFERENCE TO RELATED APPLICATION

This application is based upon and claims the benefit of priority of the prior French Patent Application No. 1654256, filed on May 12, 2016, the entire contents of which are incorporated herein by reference.

FIELD OF THE INVENTION

The present invention relates to a USB interface for recharging an electronic device, intended to equip a transport vehicle, preferably in urban public transport vehicle.

BACKGROUND

In some cases, it is provided to equip a public transport vehicle with USB interfaces, allowing passengers to recharge an electronic device, for example a smartphone or a tablet.

Such interfaces are supported by dedicated equipment. The transport vehicle includes very few such pieces of dedicated equipment, since they encroach on the space usable to accommodate passengers or receive other pieces of equipment.

SUMMARY

The invention in particular aims to improve this situation by proposing to improve access to USB interfaces, without negatively affecting the ability to accommodate passengers on the vehicle.

To that end, the invention in particular relates to a USB interface for recharging an electronic device, intended to equip a transport vehicle including at least one handrail, characterized in that it includes:
- an electronic member comprising at least one USB jack, and connector elements able to connect each USB jack to cabling,
- a support case, configured to be fastened on the handrail of the urban public transport vehicle, and including a housing for the electronic member.

The USB interfaces according to the invention can be arranged along any handrail for passengers, such that they are only positioned on equipment (the rails) pre-existing in the vehicle.

In particular, in the case of buses, the handrails are already equipped with the stop button cases, designed to notify the driver that a passenger wishes to stop at the next station. The USB interfaces according to the invention have dimensions similar to those of such stop button cases, and can be positioned on the same handrails or replace these handrails.

Such USB interfaces are not bulky, and can be positioned in multiple locations of the vehicle, and therefore be easy for a satisfactory number of passengers to access.

A USB interface according to the invention may further include one or more of the following features, considered alone or according to any technically possible combination(s).

The electronic member is fastened to the support case at least partially removably.

The USB interface includes removable fastening means for fastening at least part of the electronic member with the support case, the removable fastening means for example comprising at least one cone-pointed set screw.

The electronic control member includes: a first stationary part, fastened to the housing of the support case, and intended to be connected to the cabling, and a second removable part, bearing each USB jack, the first and second parts being removably connectable.

One of the first and second parts includes at least one connecting pin, in particular two connecting pins, and the other of the first and second parts includes, for each connecting pin, at least one respective complementary socket.

The first and second parts include complementary mistake-proofing means intended to provide the connection of each pin in the correct corresponding respective plug.

The second removable part includes: a front face, comprising each USB jack, a rear face, comprising each pin or socket, intermediate faces extending between the front and rear faces, the intermediate faces and the housing comprising a complementary guide means to guide the second removable part when it is inserted in and removed from the housing.

The support case comprises a contact face with a handrail and in which the housing extends along a central axis substantially perpendicular to the contact face.

The invention also relates to a transport vehicle, including a passenger room comprising at least one handrail, characterized in that it includes at least one USB interface as previously defined, the support case of which is fastened on the maintaining bar and in which cabling passes in the handrail, this cabling being connected to the electronic member.

The invention lastly relates to a set of equipment for a transport vehicle, the transport vehicle including at least one handrail, the set of equipment comprising a stop request device of the vehicle comprising a pushbutton, characterized in that it includes a USB interface for recharging an electronic device as previously defined, and in that the stop request device of the vehicle comprises a support case identical to the support case of the USB interface, the housing of which receives the pushbutton.

BRIEF DESCRIPTION OF THE DRAWINGS

The invention will be better understood using the following description, provided solely as an example and done in reference to the appended figures, in which.

DETAILED DESCRIPTION

Figure 1:
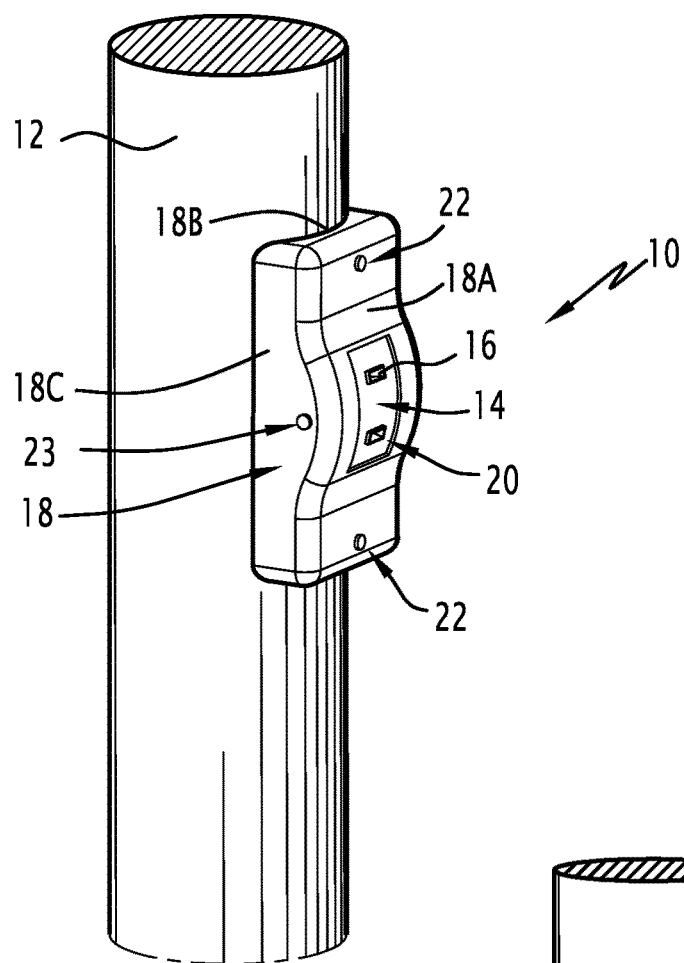
FIG. 1 is a perspective view of a USB interface according to a first example embodiment of the invention.

FIG. 1 shows a USB interface 10 according to a first example embodiment of the invention. Such an interface 10 is intended to recharge the battery of an electronic device, for example a smartphone or a tablet. This recharging mode for battery via a USB connection is traditional, and will therefore not be described in detail.

The interface 10 is intended to equip a transport vehicle, preferably in urban public transport vehicle, and more particularly a bus. Alternatively, it may equip a tram or subway.

The transport vehicle includes a handrail 12, intended to be held by a passenger in the standing position. The handrail 12 extends generally vertically, but it could alternatively extend horizontally, or in an oblique direction.

The interface 10 includes an electronic member 14 comprising at least one USB jack 16, and connector elements able to connect each USB jack to cabling. The electronic structure of the USB jack 16 and the connector elements is traditional, such that one skilled in the art will have no difficulty carrying it out.

For example, the electronic member 14 includes two USB jacks 16.

The interface 10 also includes a support case 18, configured to be fastened on the handrail 12, along the handrail 12, and including a housing 20 for the electronic member 14. The support case 18 is for example made from plastic.

The support case 18 includes a front surface 18A intended to face the passengers, in which the housing 20 emerges. The USB jacks 16 are therefore accessible on the side of this front surface 18A.

The support case 18 also includes a rear form 18B, opposite the front surface 18A, and intended to be pressed against the handrail 12. Thus, the rear form 18B has a curve complementary to that of the handrail 12.

The rear form 18B defines a contact face with the handrail. It should be noted that the housing 20 extends along a central axis substantially perpendicular to this contact face.

The support case 18 also includes side surfaces 18C extending between the front surface 18A and the rear form 18B.

The interface 10 also includes fastening means 22 on the handrail 12. These fastening means 22 for example include screws, accessible from the front surface 18A.

In this example, the support case 18 has a shape similar to that of a stop button case typically used on a bus. The fastening means 22 with screws are also the same as those used for such a stop button case.

It will be noted that said cabling is housed traditionally in the handrail 12, just as it is for a bus stop button case of the state of the art.

Advantageously, the electronic member 14 is fastened to the support case 18 at least partially removably. "At least partially removably" means that part of the electronic member 14 is removable, or it is completely removable.

To that end, means 23 are provided for removably fastening the electronic member 14 in the housing 20. These fastening means 23 are said to be removable when they allow the removal of at least part of the electronic member 14, without damaging the electronic member 14, from the support case 18 or these fastening means 23.

The removable fastening means 23 for example include at least one cone-pointed set screw, accessible from one of the side surfaces 18C of the support case 18. Such a cone-pointed set screw includes a head provided with a particular engagement shape, for example formed by three holes intended to receive a specific tool for tightening or loosening it.

Figure 2:
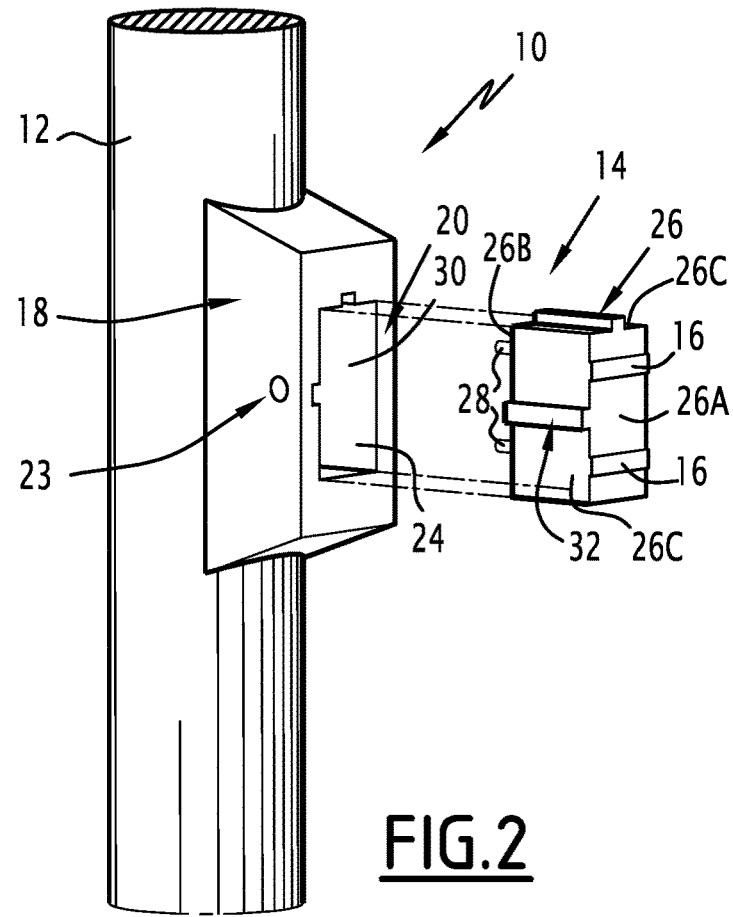
FIG. 2 is an exploded perspective view of a USB interface according to a second example embodiment of the invention.

FIG. 2 shows an interface 10 according to a second example embodiment of the invention. In this figure, the elements similar to those of FIG. 1 are designated using identical references.

According to this second embodiment, the electronic control member 14 includes a first stationary part 24, fastened to the housing 20 of the support case 18, and intended to be connected to the cabling, and a second removable part 26, bearing each USB jack 16.

The first 24 and second 26 parts are removably connectable.

To that end, one of the first 24 and second 26 parts for example includes at least one connecting pin 28, in particular two connecting pins 28, and the other of the first 24 and second 26 parts includes, for each connecting pin 28, at least one respective complementary socket 30.

In the described example, the pins are supported by the second part 26, and the sockets by the first part 24.

Advantageously, the first 24 and second 26 parts include complementary mistake-proofing means 32 intended to ensure that each pin 28 is correctly connected in the corresponding respective socket 30, and not in another one. The mistake-proofing means 32 for example include a mistake-proofing lug supported by the second part 26, and a receiving notch supported by the first part 24.

As shown in FIG. 2, the second removable part 26 includes:
  a front face 26, comprising each USB jack 16,
  a rear face 26B, comprising each pin 28, and
  intermediate faces 26C extending between the front 26A and rear 26B faces, the intermediate faces 26C and the housing 20 comprising a complementary guide means to guide the second removable 26 part when it is inserted in and removed from the housing 20.

The guide means are for example simply formed by the intermediate faces themselves.

According to this second embodiment, the second removable part 26 is fastened to the support case 18 by the removable fastening means 23, which are of the same type as previously described.

The interface 10 according to the second embodiment has the advantage of allowing easy replacement of damaged USB jacks. Indeed, this replacement is done by replacing only the second part 26. This replacement does not require touching the connections with the cabling, but only removing the pins 28 of the second parts to be replaced from the sockets 30, then inserting the pins of the replacement second part 26 in the corresponding sockets 30.

It clearly appears that the interface 10 according to the invention is particularly simple to install, and is not cumbersome, such that it is easy to make such interfaces 10 available in various locations of the vehicle.

Advantageously, the interface 10 is part of a set of equipment for the transport vehicle, this set of equipment further comprising a stop request device of the vehicle comprising a pushbutton. In this case, the stop request device of the vehicle advantageously comprises a support case identical to the support case of the USB interface, the housing of which receives the pushbutton.

The invention claimed is:

1. A USB interface for recharging an electronic device, intended to equip an urban public transport vehicle comprising at least one handrail, comprises:
  an electronic member comprising at least one USB jack, and connector elements able to connect each USB jack to cabling, and
  a support case, configured to be fastened on the handrail of the urban public transport vehicle, and including a housing for the electronic member, comprising:
    a front surface in which the housing emerges;
    a rear form, opposite the front surface, and intended to be pressed against the handrail; and
    side surfaces extending between the front surface and the rear form, wherein the electronic member comprises:

a first stationary part, fastened in the housing of the support case, and intended to be connected to the cabling, and a second removable part, bearing each USB jack, the first stationary part and the second removable part being removably connectable, and wherein the electronic member is fastened to the support case by removable fastening elements accessible from one of the side surfaces of the support case.

2. The USB interface according to claim 1, wherein the electronic member is fastened to the support case at least partially removably.

3. The USB interface according to claim 2, further comprising removable fasteners for fastening at least part of the electronic member with the support case.

4. The USB interface according to claim 3, wherein the removable fasteners comprise at least one cone-pointed set screw.

5. The USB interface according to claim 1, wherein one of the first stationary part and the second removable part comprises at least one connecting pin, and the other of the first stationary part and the second removable part comprises, for each connecting pin, at least one respective complementary socket.

6. The USB interface according to claim 5, wherein the first stationary part and the second removable part comprise complementary mistake-proofing shapes intended to provide the connection of each pin in the correct corresponding respective plug.

7. The USB interface according to claim 5, wherein the second removable part comprises:

a front face, comprising each USB jack, a rear face, comprising each pin or socket, intermediate faces extending between the front and rear faces, the intermediate faces and the housing comprising a complementary guide to guide the second removable part when it is inserted in and removed from the housing.

8. The USB interface according to claim 1, wherein the support case comprises a contact face with the handrail and wherein the housing extends along a central axis substantially perpendicular to the contact face.

9. The USB interface according to claim 1, wherein the fastening elements comprise at least one cone-pointed set screw.

10. A transport vehicle, comprising a passenger room comprising at least one handrail, comprises at least one USB interface for recharging an electronic device, each USB interface comprising:

an electronic member comprising at least one USB jack, and connector elements able to connect each USB jack to cabling, and a support case, configured to be fastened on the handrail of the urban public transport vehicle, and including a housing for the electronic member, comprising:

a front surface in which the housing emerges;

a rear form, opposite the front surface, and intended to be pressed against the handrail; and side surfaces extending between the front surface and the rear form, and wherein the support case is fastened on the maintaining bar and in which cabling passes in the handrail, this cabling being connected to the electronic member, and wherein the electronic member includes:

a first stationary part, fastened in the housing of the support case, and intended to be connected to the cabling, and a second removable part, bearing each USB jack, the first stationary part and the second removable part being removably connectable, wherein the electronic member is fastened to the support case by removable fastening elements accessible from one of the side surfaces of the support case.

* * * * *